Sept. 8, 1925.

C. W. HUTCHINSON

PNEUMATIC TIRE PUMP

Filed Feb. 16, 1925

1,552,930

Inventor:
Charles W. Hutchinson

Patented Sept. 8, 1925.

1,552,930

UNITED STATES PATENT OFFICE.

CHARLES W. HUTCHINSON, OF MILWAUKEE, WISCONSIN.

PNEUMATIC-TIRE PUMP.

Application filed February 16, 1925. Serial No. 9,502.

*To all whom it may concern:*

Be it known that I, CHARLES W. HUTCH-INSON, a citizen of the United States, and resident of Milwaukee, in the county of Milwaukee and State of Wisconsin, have invented certain new and useful Improvements in Pneumatic-Tire Pumps; and I do hereby declare that the following is a full, clear, and exact description thereof.

This invention pertains to improvements in pneumatic tire pumps and has primarily for its object to provide a comparatively simple, compact, and inexpensive device of this character, which may be detachably mounted upon a wheel of a vehicle to facilitate operation.

A further object is to render the attaching means adjustable to various sizes of tires.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far advised for the practical application of the principles thereof.

At the present time many types of manually operable pneumatic tire pumps are employed, practically all of which are positioned upon the ground or step of machine or running board, for operation, which requires the operator to bend over in an awkward position in either case, and results in the pump becoming covered with dirt or mud in instances where it is necessary to inflate a tire on muddy ground or roads.

Furthermore, the average lever manipulated pump is very bulky and cumbersome, making it difficult to store and carry the same within the limited space provided in the ordinary motor vehicle for the storage of tools.

The present invention is designed to overcome these objections, and enable the pump to be positioned at a desirable height where a maximum leverage for operation may be obtained with little effort and the pump held firmly in position during its working stroke.

To accomplish the foregoing, I propose to utilize a single action pump comprising a cylinder 1, through the top of which is projected a piston rod 2. The lower end of the pump cylinder 1 is provided with the usual outlet nozzle to which is attached a conventional flexible hose 3 for attachment with the pneumatic tube to be inflated.

Figure 1:
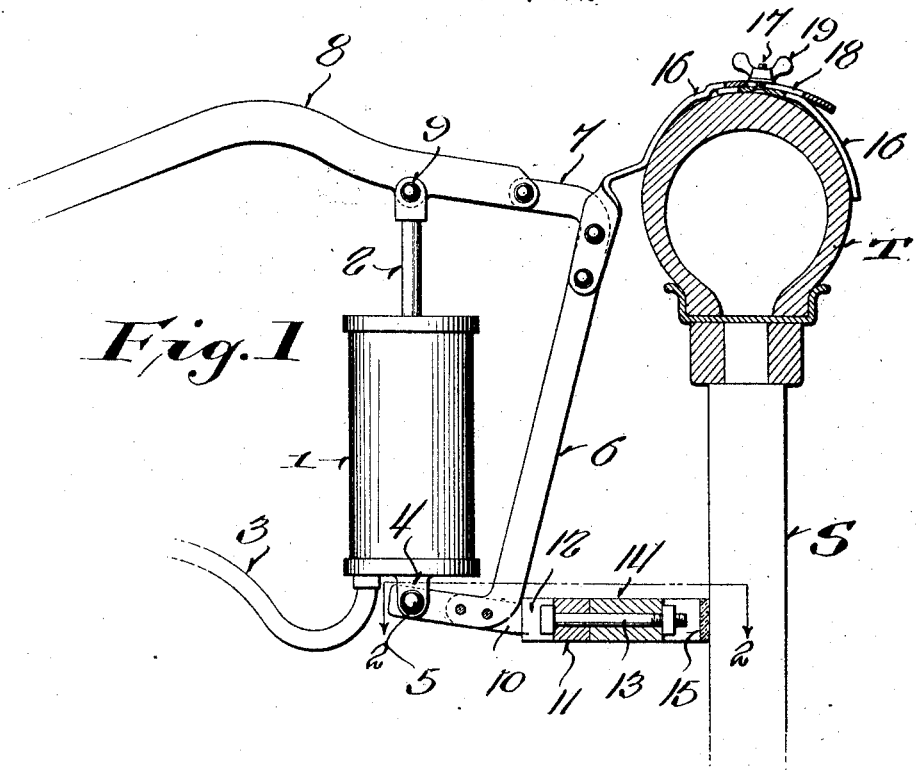
Figure 1 is an elevational view of a pump constructed in accordance with the present invention, with parts broken away and in section to more clearly illustrate the structural details; the same being shown in connection with a conventional structure of vehicle wheel and pneumatic tire.
Figure 2:
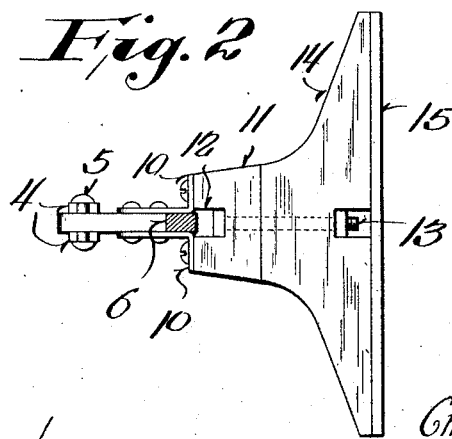
Figure 2 is a sectional view taken on the line 2—2 of Figure 1.

The lower end of cylinder 1 also has projecting therefrom a pair of ears 4 for the reception of a bolt or rivet 5 which carries a bracket 6. As illustrated in Figure 1 of the drawing, the bracket 6 extends upwardly and above the pump cylinder, and has its upper end terminating in a lateral projection 7, to which is pivotally secured the operating lever 8 that is connected with the piston rod 2 by means of the pin 9.

Secured to the lower end of the bracket 6, by means of a pair of angle plates 10 is a block 11 provided with a recess 12 for the reception of the head of the bolt 13 carried thereby. Mounted on the bolt 13 is a shoe 14, which, by means of its connection with the block 11, may be rotated with relation thereto. In the operating position of the pump, the shoe 14 is turned in a horizontal position for abutting engagement with the spokes S of a vehicle wheel, as indicated in Figure 1. While I have illustrated a conventional wood type of wheel, it is obvious that the present invention is also applicable to wheels of other structure, such as disc or wire wheels, the shoe 14 serving to engage the wheel interiorly of the felloe. To prevent scratching or marring of the wheel, the shoe 14 has secured to its face a pad 15 of any suitable material, such as leather, rubber or felt. When the device is to be packed for shipping or carrying, the shoe 14 may be swung to a vetrical position on the bolt 13, thus making the apparatus compact and requiring small storage space.

Secured to the upper portion of the bracket 6, or formed integrally therewith, is an arcuate arm 16, adapted to engage the outer periphery of the tire T and for the purpose of making said arm adjustable to tires of various diameters, the arm 16 is preferably formed in two pieces, the outer member 16′ being slidably connected to the inner member 16 by means of a bolt 17 passing through the member 16′ and the slot 18, provided in the inner arm 16. The two members are locked in their adjusted position by means of a thumb nut 19 threaded on the bolt 17.

From the foregoing description, it is obvious that a very simple and inexpensive structure has been provided which may be quickly and conveniently mounted upon the conventional vehicle wheel, by merely placing the gripping arm 16 over the tire and abutting the shoe 14 against the spokes or upper portion of the wheel. This positions the pump at a convenient height above the ground, which eliminates the necessity of a person bending down in an awkward position in order to operate the pump, and because of this fact it is obvious that the maximum leverage for actuating the pump may be obtained with little effort. Further, by this arrangement, the pump is held above the mud and dirt, thus preventing other tools with which it is stored from getting rusty and dirty. While I have shown the gripping arm 16 formed as a separate member and secured to the bracket 6 by means of rivets, it is obvious that the same might be constructed as an integral part thereof. Further, in instances where the apparatus is made up as standard equipment, the adjustable feature of the gripping arm 16 may also be eliminated and the arm made in one piece.

From the foregoing description, it will be seen that the pump can quickly and readily be dropped in position over the wheel for functioning, without resorting to clamps or screws for fastening it in place, gravity gripping units being so arranged and balanced that they will firmly hold the pump while the pressure is being applied for inflating the tires, and obviously it follows that after using the pump, all that is necessary is to lift it from its position and fold it compactly for storage.

I claim:

1. In a pneumatic tire pump, the combination of means carried by the pump for gripping the outer periphery of a tire positioned upon a vehicle wheel, and means connected to the gripping means and arranged for abutting engagement with said vehicle wheel interiorly of the felloe, whereby the pump may be detachably mounted upon said vehicle wheel.

2. In a pneumatic tire pump, the combination of means carried by the pump for gripping the outer periphery of a tire positioned upon a vehicle wheel, said means being adjustable to tires of various diameters in cross sections, and a shoe for abutting engagement with said vehicle wheel interiorly of the felloe, said shoe being connected with said means, whereby the pump may be detachably mounted upon said vehicle wheel, said shoe being rotatably connected with said pump to render the same compact for storage.

3. In a pneumatic tire pump the combination of a cylinder and a piston rod operable within the same, a bracket having a pivotal connection with one end of said cylinder, means carried by the bracket for gripping the periphery of a vehicle wheel, a shoe carried by said bracket for engaging the wheel interiorly of the felloe, and an operating lever pivotally connected with said bracket and piston rod.

4. In a pneumatic tire pump the combination of a cylinder and a piston rod operable within the same, a bracket having a pivotal connection with one end of said cylinder, adjustable means carried by said bracket for engaging the outer periphery of a tire positioned upon a vehicle wheel, a shoe pivotally carried by the lower end of said bracket for abutting engagement with the wheel interiorly of the felloe, and an operating lever having pivotal connection with said bracket and piston rod.

In testimony that I claim the foregoing I have hereunto set my hand at Milwaukee, in the county of Milwaukee and State of Wisconsin.

CHARLES W. HUTCHINSON.